United States Patent [19]
Bradbury et al.

[11] Patent Number: 5,534,854
[45] Date of Patent: Jul. 9, 1996

[54] FAN FAILURE ALERT FOR ELECTRONIC EQUIPMENT

[76] Inventors: Rod J. Bradbury, 40323 Heathrow Dr., Palmdale, Calif. 93551; Willard C. Barnard, 13800 Oro Grande St., Sylmar, Calif. 91342; Joel F. Wysong, Apt. C-56, 38415 5th St. West, Palmdale, Calif. 93551

[21] Appl. No.: 500,457

[22] Filed: Jul. 10, 1995

[51] Int. Cl.⁶ .................................................. G08B 21/00
[52] U.S. Cl. ..................... 340/648; 310/68 B; 310/68 C; 324/166; 340/635; 340/661; 340/663
[58] Field of Search .................................. 340/648, 635, 340/663, 661; 324/166; 310/68 C, 68 B

[56] References Cited

U.S. PATENT DOCUMENTS 3,885,200  5/1975  Burkle ..................................... 361/103
4,479,115  10/1984  Holzhauer ............................... 340/635
4,977,375  12/1990  Toth ......................................... 340/648

*Primary Examiner*—Glen Swann
*Attorney, Agent, or Firm*—Roger A. Marrs

[57] ABSTRACT

A detection and alarm circuit for protection of electronic components includes a fan motor current sensing resistor for producing a pulse that is amplified and introduced to a frequency-to-voltage converter for generating a filtered and processed voltage level for application to a voltage comparator. A reference voltage circuit supplies a voltage level to the comparator for matching with the filtered and processed voltage level and depending on the mismatch, an output signal is introduced to a transistor switch for operating an alert alarm device.

7 Claims, 1 Drawing Sheet

FAN FAILURE ALERT FOR ELECTRONIC EQUIPMENT

BACKGROUND OF THE INVENTION

1. Field of the Invention

The present invention relates to the field of monitoring and detection devices, and more particularly to a novel device for monitoring and detecting the speed and/or fan or blower failure when particularly used in connection with the cooling of electronic components in a computer.

2. Description of the Prior Art

In the past, it has been desirable to provide a monitoring means for automatically sensing, detecting or determining the speed of a fan or blower and/or to determine when the fan has failed, slowed down or even stopped. The result of such failure is to permit electronic components in the computer to heat and cause circuit failure. One prior attempt to monitor the operation of a cooling fan was to detect the fan's speed by sensing the rate at which an optical path was interrupted by the fan blades. Another attempt is represented by a device and circuit to monitor the fan speed by using a magnetic means to sense the rate at Which the magnetic field created by the fan motor is rotating. Still a further attempt relates to monitoring the cooling air flow by sensing air flow pressure such as with a microphone. Some of these prior attempts are more clearly disclosed in U.S. Pat. No. 3,885,200 and U.S. Pat. No. 4,479,115.

These prior approaches and circuits have created problems and difficulties since their size and complexity requires mounting in close proximity to the fan which is not always possible in compact devices such as in the manner that computers are manufactured at the present time. In some cases, it is not possible to mount prior monitoring devices since the fan mounts on heat sinks and particularly in instances where a microprocessor fan is employed. Also, monitoring the fan operation employing a thermistor requires that the device be mounted in front of the fan which is not always possible. Therefore, it can be seen that physical mounting problems for the prior devices are not easily solved and that such devices would be subject to dust and lint that would block instances where light paths are used for monitoring purposes.

Therefore, a long-standing need has existed to provide an electrical circuit which may be readily introduced into the connection between a computer power supply and the cooling fan for components thereof which need not require special mounting mechanisms and which will sense or monitor operation of the fan in a purely electrical way so that optics, sound pressure waves or the like are not relied upon in the detection portion of the circuit.

SUMMARY OF THE INVENTION

Accordingly, the above problems and difficulties are avoided by the present invention which provides a novel fan failure alert system for computers or other critical electronic components which includes a current sensing resistor in the power supply line of the fan motor which produces a pulse that is AC fed into an amplifier section of an integrated circuit. After amplification, the resultant signal is fed to a frequency-to-voltage converter where a filtered output is introduced to a comparator. A second output representing a reference voltage developed from a reference voltage source is introduced simultaneously to the comparator where the two voltages are compared and depending on the comparison, a switch is subsequently operated which actuates an alarm or alert device.

Therefore, it is a primary object of the present invention to provide a novel monitoring circuit which warns computer users when the critical cooling fan or blower for internal microprocessors has failed and wherein the circuit is simple and easy to incorporate into most DC fan applications where it is vital to keep components cool.

Another object of the present invention is to provide a fan or blower alert circuit which is capable of detecting malfunction in a fan or blower used in a computer or related equipment that protects internal computer microprocessors or other critical electronic components.

Still another object of the present invention is to provide a novel monitoring circuit for a fan blower or motor which detects when the fan is malfunctioning, such as stopping completely or turning below a predetermined RPM level so that a circuit or microprocessor will not be damaged upon cessation of air flow.

Yet a further object of the present invention is to provide a novel fan alert circuit that is reliable, requires no maintenance and has no mechanical or mounting problems, and in the case of a computer microprocessor fan, only needs to be installed in the connection between the computer power supply and the fan motor.

A further object of the invention resides in a fan monitoring circuit which generates a tone when the equipment is first turned on advising the user that the circuit is in working condition.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
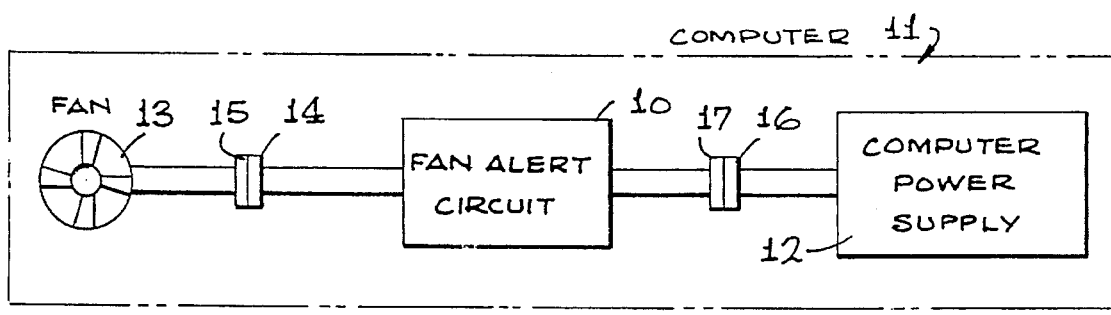
FIG. 1 is a simplified block diagram showing the novel fan alert circuit installed between a computer power supply and the motor of a fan intended to be monitored.

Referring to FIG. 1, the novel fan failure alert device for electronic equipment is indicated by numeral 10 and it is to be understood that the circuit is within the confines of a computer 11 which encloses further critical electronic components and microprocessors. The computer includes a power supply 12 and a fan or blower 13 which is also within the enclosure of the computer and is positioned so that its airways will pass over and cool adjacent electrical components. It can be seen that the novel fan alert circuit 10 is disposed in the power line connecting the fan 13 with the power supply 12. The circuit 10 includes a plug 14 which is insertably received into an electrical socket 15 connected to the fan motor 13. The power supply 12 includes a plug 16 at the end of its power cord which is insertably received into a socket 17 connected to the fan alert circuit 10. Since the arrangement is in electrical series, the power supply from the supply 12 is introduced to the motor of the fan 13 via the alert circuit 10. Therefore, the installation is extremely simple and is achieved by unplugging the fan from the computer power supply and by plugging in the circuit 10 in the line.

Figure 2:
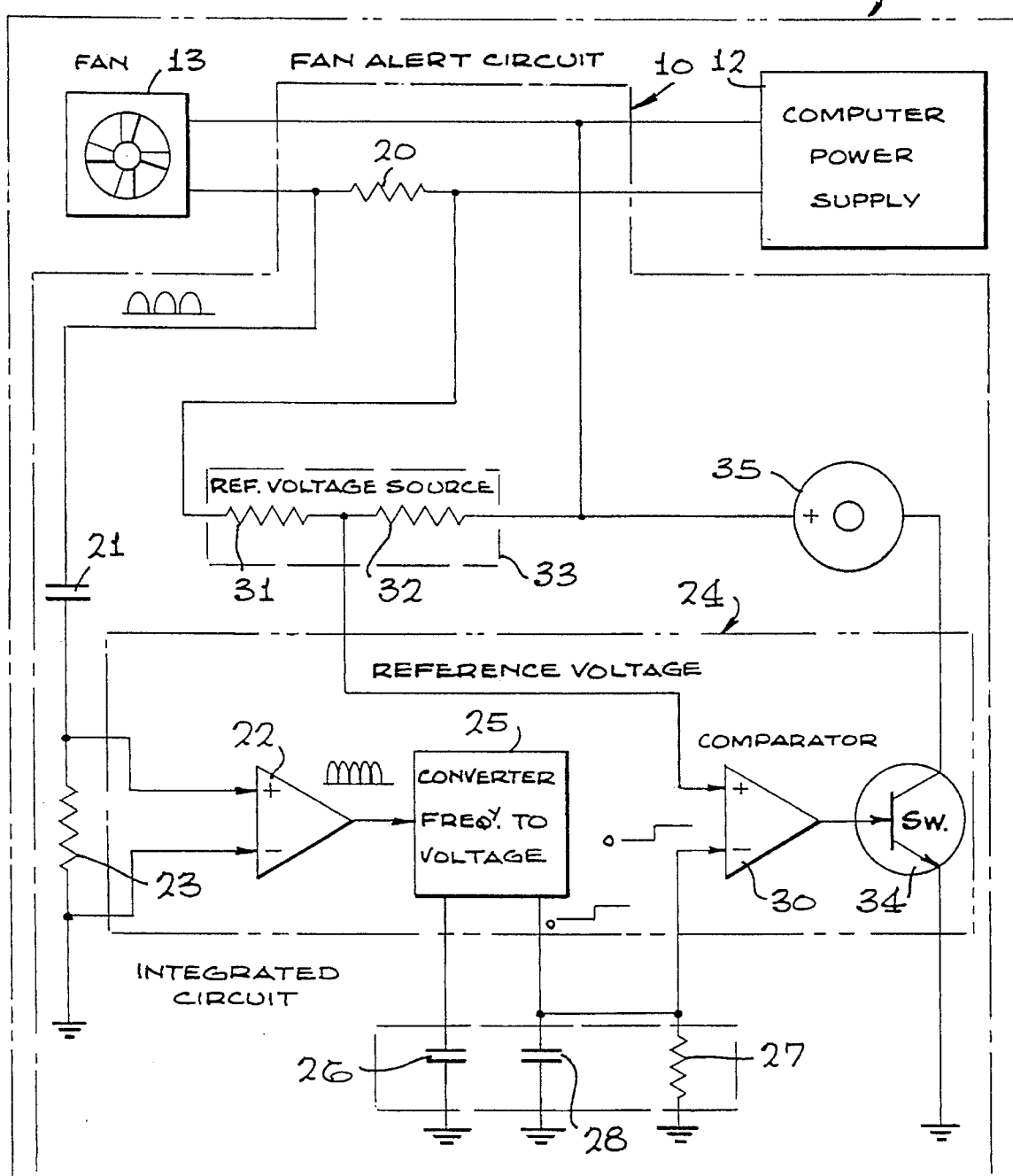
FIG. 2 is a combined block and circuit schematic diagram illustrating the fan alert circuit in detail.

Referring now in general to FIG. 2, the fan 13 is illustrated and it is the speed of the fan which is to be monitored by the circuit 10. In this connection, a resistor 20 is placed in series with the fan ground lead which is supplied with power from the computer power supply 12. The current changes experienced by the fan motor are produced by the DC electronic commutated fan motor and are sensed as pulses at the resistor 20. Next, the sensed pulses are AC coupled by capacitor 21 into an operational amplifier 22 in combination with resistor 23. The operational amplifier 22 forms a part of an integrated circuit 24 along with a frequency-to-voltage converter 25 which receives the amplified pulses from the amplifier 22. The pulse from the amplifier is introduced into a charge pump frequency-to-voltage converter which converts the input frequency to a DC voltage output. To produce this result, the circuit includes a capacitor 26, an output resistor 27 and an integrating or filter capacitor 28. The filter capacitor 28 is selected for ripple rejection and response time. The DC voltage is then fed into a comparator 30 which is included in the integrated circuit. The comparator reference voltage is selected and set by the resistors 31 and 32 within a reference voltage source 33. The reference voltage is employed for triggering the output of the comparator at a low frequency. The output of the comparator 30 is applied to a transistor switch 34 which is also included in the integrated circuit 24. The transistor switches to ground and turns the alert device 35 "on".

While the fan 13 is operating at a safe speed and stays above the set level of the comparator 30, the transistor switch 34 will not turn "on". As soon as the fan fails or slows down, the frequency of the pulses will widen and the charge pump frequency to the voltage converter 25 will have a lower voltage output to the comparator 30. When the voltage drops below the set value of the resistors 31 and 32, the output of the comparator 30 will go "high" which turns "on" the transistor switch which will drive its collector electrode to ground and turn "on" the alert device 35. The alert device may take the form of a visual display, a sound alarm or any combination of attention alerting devices and techniques.

The entire circuit 10 may be manufactured on a circuit board as small as one to two inches or may be included in the computer or other electronic equipment circuit board construction. In the present example, the alert device 35 is in a circuit board with the components of the alert circuit; however, the alert device may be mounted on an outside case or cabinet of the computer or electronic equipment. The output control from the transistor 34 may also be employed for controlling other devices including lamps, Leds, relays or signals which may interrupt programs that are currently running. The integrated circuit 24 is a standard component manufactured by National Semiconducter, having the component part number LM2907 and is referred to as a frequency-to-voltage (tachometer/speed) chip.

In actual operation, and in accordance with the present invention, the resistor 20 is connected in series with the motor of the fan 13 and monitors the current changes that are present from the fan motors DC electronic commutater. This detection or monitoring produces a pulse that is AC coupled and fed into the amplifier section 22 of the integrated circuit 24. This frequency is introduced into the charge pump frequency-to-voltage converter 25 which produces a voltage introduced to the comparator input 1 of the comparator 30. The comparator is then set to a reference voltage which is applied to input 2 that relates to the speed of the fan at its low RPM. When the fan drops below the set level, the comparator turns "on" the transistor switch 34 that switches to ground and turns on the 12 volt DC alarm or lamp or other signalling device which interrupts circuitry to other software package components that might be running.

The circuit of the present invention may be used in medical equipment to warn when critical cooling by fans has stopped or may be employed in equipment that is running unattended and the use of the output trigger switch of the circuit may be employed to interrupt software or control some other device to warn or take over a cooling function.

A feature of the present invention resides in that the circuit produces an audible tone when the equipment is first turned "on" so as to advise the user that the circuit is operational.

While particular embodiments of the present invention have been shown and described, it will be obvious to those skilled in the art that changes and modifications may be made without departing from this invention in its braoder aspects and, therefore, the aim in the appended claims is to cover all such changes and modifications as fall within the true spirit and scope of this invention.

What is claimed is:

1. A fan failure alert for electronic equipment comprising:
   a fan alert circuit coupled between a fan and its power source, said alert circuit comprising:
   a resistance sensing and pulse producing means for generating pulses having a frequency proportional to the fan's operating speed;
   an amplifier for receiving said pulses from said resistance sensing and pulse producing means;
   a frequency-to-voltage converter circuit coupled to said amplifier for producing an output voltage level in response to said amplified pulses;
   a reference voltage source connected to said resistance sensing and pulse producing means in parallel with said amplifier and said converter for setting a reference voltage level;
   a voltage comparator circuit receiving said reference voltage level and said output voltage level for comparison and for generating a signal responsive to a difference between said reference voltage level and said output reference level; and
   a switch connected to said comparator circuit operable in response to said signal for actuating an alert means.

2. The invention as defined in claim 1 wherein:
   said fan alert circuit is operably connected in series between and with said power source and said electrical fan with said resistance sensing and pulse producing means being coupled in electrical series with a fan ground lead conducting power from said power source.

3. The invention as defined in claim 2 wherein:
   said resistance sensing and pulse producing means includes a resistor experiencing current changes in said electrical fan.

4. The invention as defined in claim 3 wherein:
   said frequency-to-voltage converter includes an input charge pump circuit means converting the frequency from said amplifier to said output voltage level for comparison with said reference voltage level so that when said output voltage is below a set level said signal is generated to said switch.

5. The invention as defined in claim 4 wherein:
   said frequency-to-voltage converter includes a DC voltage level setting circuit including a pair of parallel connected capacitors with an output resistor coupled across a selected one of said capacitors of said pair of capacitors.

6. The invention as defined in claim 5, wherein:

said selected capacitor is an integrating and filter capacitor.

7. The invention as defined in claim 6 wherein:

said voltage level from said converter being below said reference voltage causes the output of said comparator to produce a high voltage level to activate said switch.

* * * * *